(12) United States Patent
Yamamoto

(10) Patent No.: US 6,788,955 B2
(45) Date of Patent: Sep. 7, 2004

(54) RADIO COMMUNICATION APPARATUS

(75) Inventor: Etsuji Yamamoto, Toyko (JP)

(73) Assignee: Vertex Standard Co. Ltd., Tokyo (JP)

( * ) Notice: Subject to any disclaimer, the term of this patent is extended or adjusted under 35 U.S.C. 154(b) by 519 days.

(21) Appl. No.: 09/997,119

(22) Filed: Nov. 28, 2001

(65) Prior Publication Data

US 2002/0065096 A1 May 30, 2002

(30) Foreign Application Priority Data

Nov. 29, 2000 (JP) ........................................ 2000-363747

(51) Int. Cl.$^7$ .............................................. H04Q 7/20
(52) U.S. Cl. .................................................. 455/550.1
(58) Field of Search ............................. 455/403, 412.1, 455/412.2, 414.1, 514, 88, 550.1, 575.6, 90.1, 90.3, 115.4, 566, 567, 556.1, 557

(56) References Cited

U.S. PATENT DOCUMENTS

| | | | | |
|---|---|---|---|---|
| 5,274,802 A | * | 12/1993 | Altine ........................ | 707/202 |
| 5,656,802 A | * | 8/1997 | Aoki ........................... | 235/454 |
| 6,075,983 A | * | 6/2000 | Kumagai .................... | 455/410 |
| 6,463,278 B2 | * | 10/2002 | Kraft et al. .................. | 455/418 |
| 6,519,481 B1 | * | 2/2003 | Kobayashi ................... | 455/566 |

* cited by examiner

Primary Examiner—Jean Gelin
(74) Attorney, Agent, or Firm—Fulwider Patton Lee & Utecht (57) ABSTRACT

In a radio communication apparatus according to the present invention, an expansion of the functional capabilities to allow for checking whether functional settings made for a previous communication are different from functional settings for a current communication. Then, if so, notification is made so that the functional settings can be restored to their original states. When an operator sets status registration mode by means of predetermined keys on an operator section for the occasion of an operator change, for example, the micro controller unit (MCU) records functional setting data at that point in the data table of a RAM. Then, when the operator sets a status confirmation mode by the use of predetermined keys in order to resume communication, the MCU records functional setting data at that point corresponding to the functional setting data for the previous communication and the functional items associated therewith. Then, the MCU makes a comparison between the current functional setting data and the previous functional setting data, for each functional item. If the current functional setting data does not coincide with the previous functional setting data, notification is made by the use of an indicator lamp and a liquid crystal display section.

10 Claims, 5 Drawing Sheets

| FUNCTION | Dset | Dref | |
|---|---|---|---|
| MODE | AM | AM | |
| FREQ(T) | 144.86MHz | 145.53MHz | ← |
| FREQ(R) | 144.86MHz | 144.94MHz | ← |
| VFO/MR | VFO | VFO | |
| STEP | 10KHz | 10KHz | |
| DSP | NB | NB | |
| AF VOL | 32.05dB | 48.74dB | ← |
| SQL | ON | ON | |
| RF GAIN | 40dB | 40dB | |
| CLAR | OFF | ON | ← |
| IF SHIFT | ON | OFF | ← |
| ⋮ | ⋮ | ⋮ | |

RADIO COMMUNICATION APPARATUS

BACKGROUND OF THE INVENTION

1. Field of the Invention

The present invention relates to a radio communication apparatus. More specifically, the invention relates to an expansion of the functional capabilities of the radio communication apparatus. The expansion provides for the checking of the various functional settings previously made for performing communication to determine if any of the settings have been modified at a later stage before resumption of the communication, and if so, notification is made to facilitate restoration of the functional settings to their original states.

2. Description of the Related Art

In recent years, most radio communication apparatuses contain a microcomputer circuit therein to allow control of various functions by manipulating switches and dials.

Thus, a plurality of push-button switches and dial knobs are provided for an operation panel of a radio communication apparatus. A lot of radio communication apparatuses employ a system of displaying on their liquid display section settings associated with main functions.

Figure 6:
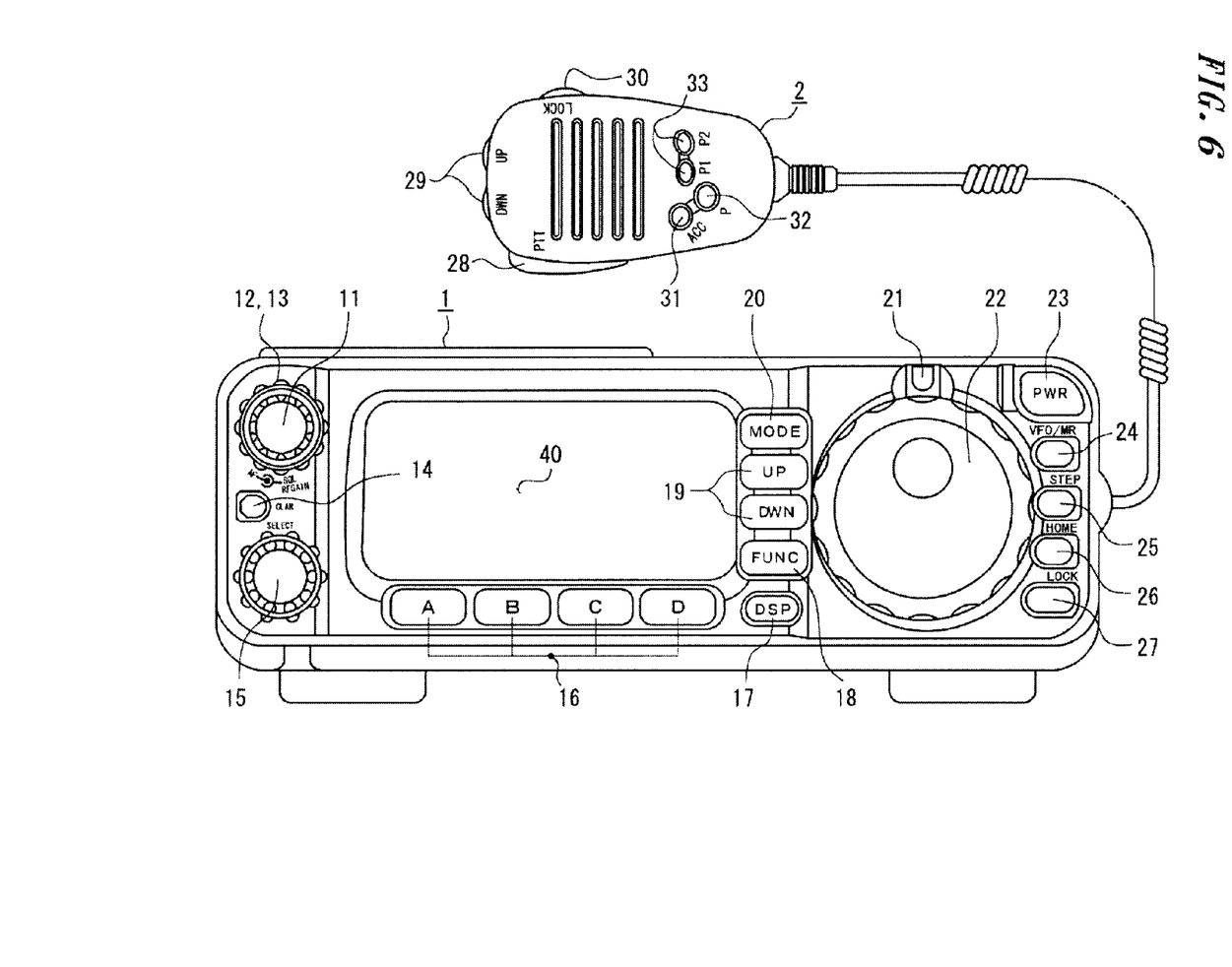
FIG. 6 is a top view of the radio transmitter-receiver.

To take an example, as shown in FIG. 6, a main unit 1 of an amateur radio transmitter-receiver has a plurality of switches and knobs disposed in a rational manner for ease of operation. Further, several switches are provided in a microphone 2 for enabling quick operation. The specific functions of these switches and knobs are as follows:

(1) An AF volume knob 11 adjusts a received sound volume.

(2) An SQL (squelch) knob 12 is used for eliminating noise in the absence of a signal.

(3) The SQL knob 12 serves as an RF GAIN knob 13 as well. The RF GAIN knob 13 is used to adjust a gain of a receiving section. According to a selected menu mode, switching is performed between the RF GAIN knob 13 and the SQL knob 12.

(4) A CLAR (clarifier) switch 14 is employed when a SELECT knob 15 is used to perform a CLAR function of changing a receiving frequency alone without changing a transmitting frequency.

(5) The SELECT knob 15 is used to perform functions of setting a frequency, selecting a memory channel, setting an IF shift, clarification, and selecting a menu mode by switching, according to an operation status.

(6) A multifunction switch 16 is used to perform various functions, and the assigned functions to be performed are switched by a FUNC switch 18.

(7) A DSP (digital signal processor) switch 17 controls a built-in DSP to perform switching between a DSP NR, a DSP AUTO NOTCH, a DSP BPF mode. The DSP NR is a function of canceling a succession of noise in the frequency band, and the DSP AUTO NOTCH is a function of reducing a beat tone of a received signal. The DSP BPF is a function of controlling a lower cut-off frequency a higher cut-off frequency separately in a BPF function of the DSP to remove radio interference and compensate a receiving frequency response, and adjusting a BPF center frequency to follow a BFO pitch in a CW mode.

(8) A FUNC (function) switch 18 switches the assigned functions of the multifunction switch 16.

(9) UP and DWN (down) switches 19 switches operation bands.

(10) A MODE switch 20 switches emission modes, and each time the switch is turned ON, the mode is sequentially switched from an LSB, a CW, an AM, to an FM mode. Further, each time the switch is continuously pressed for five seconds or longer, the mode is sequentially switched from a USB, a CWR, a DIG, to a WFM mode.

(11) An indicator lamp 21 shows a transmission/reception status. The indicator lamp 21 turns red in a transmit mode and turns green in a receive mode.

(12) Though a DIAL (dial) knob 22 is mainly used to make a frequency adjustment, it also makes various adjustments according to functional settings made by the FUNC switch 18.

(13) A PWR (power) switch 23 turns power ON or OFF.

(14) A VFO/MR switch 24 performs switching between a VFO scanning function and a memory channel scanning function.

(15) A STEP switch 25 switches steps during the frequency adjustment.

(16) A HOME switch 26 calls various frequencies used frequently.

(17) A LOCK switch 27 locks settings that have been made by using switches and knobs on the operation panel.

(18) A PTT switch 28 sets the transmit mode when turned ON, and sets the receive mode when turned OFF.

(19) UP and DWN (down) switches 29 perform the same control as the UP and DOWN switches 19 in the main unit 1.

(20) A LOCK switch 30 performs the same control as the LOCK switch 27 in the main unit 1.

(21) An ACC switch 31 calls a home channel of a frequency band being currently used.

(22) A P switch 32 performs the same control as the VFO/MR switch 24 in the main unit (23) P1 and P2 switches 33 are used for a shift from a lower frequency band to a higher frequency band in a step set by the STEP switch 25.

Recently, various functions of a radio communication apparatus are realized or utilized in the above-mentioned manner by manipulation of a single switch or knob or a combination of any of switches and knobs. Essential data in functional settings made by this manipulation is displayed on a liquid crystal display section (indicated by reference numeral 40 in FIG. 6) in the form of numbers and icons.

In the case of the amateur radio transmitter-receiver described above, the number of functions set by various manipulations often exceeds one hundred functions, and even if they are confined to the main functions used frequently during normal operation, the number of the main functions often exceeds a dozen.

Accordingly, even a skilled operator seldom correctly grasps all of the functional settings during operation. Let us assume the case where communication has been suspended for a change of operator and then communication is resumed by the former operator. In this case, complete restoration of the original functional setting states is extremely difficult, if any of the modifications in the functional settings has been made after the change of operator.

If the settings made by using the switches and knobs are locked by means of the LOCK switch 27, the operation by the subsequent operator becomes invalid. Thus, a modification in the functional settings can also be made invalid. However, when communication is made by the subsequent operator, switching of the transmit and receive modes by means of the PTT switch 28 alone becomes valid. Functional settings to other radio modes and frequencies, and communication with a change in the received sound volume, however, cannot be performed.

Further, by means of the HOME switch 26, the return to several home channels alone can be performed. However, these channels have to be registered in advance, and a channel to be used is changed frequently in a step-by-step manner during practical operation. For this reason, use of the HOME switch is not effective in solving the problem described above.

Further, in automobile-mounted radio communication apparatuses, an unintended erroneous operation tends to occur. To take an example, inadvertent touching on a dial instead of a switching operation to cause a change in frequency can be pointed out.

In such a case, in order to continue the communication that has been being performed so far, it is necessary to urgently restore the functional settings to their original states. However, the operator is not informed of the immediately preceding functional settings, so that in this situation, he is often at a loss as to what to do.

SUMMARY OF THE INVENTION

The present invention has been made in view of the problems described above. It is therefore an object of the present invention to provide a radio communication apparatus with an expansion of functional features. The expansion is such that, the apparatus can check whether any of the functional settings for a previous communication are modified in a current communication, and if so, notification is made to facilitate restoration of the functional settings to their original states for the previous communication.

The present invention is applied to a radio communication apparatus in which a microcomputer circuit of the apparatus controls communication circuits thereof according to various command inputs from an operator section thereof. With this arrangement, various functional settings associated with communication conditions are made.

According to a first embodiment of the subject invention, the above radio communication apparatus comprises:

registration commanding means for commanding registration of the functional settings;

confirmation commanding means for commanding confirmation of the functional settings;

storage means having a first data storage area and a second data storage area, both being classified into fields according to respective functional items;

detection means for detecting functional settings for the communication circuits, associated with the respective functional items at a point when a command is issued from the registration commanding means or the confirmation commanding means;

data recording means for writing data on the functional settings detected by the detection means into the first data storage area in the storage means, corresponding to the respective functional items, according to the command from the registration commanding means, and writing data on the functional settings detected by the detection means into the second data storage area in the storage means, corresponding to the respective functional items, according to the command from the confirmation commanding means;

comparator means for comparing the functional setting data associated with the respective functional items in the first data storage area with the functional setting data associated with the respective functional items in the second storage area after the data recording means writes the functional setting data into the second data storage area in the storage means; and notification means for notifying of a noncoincidence when a result of the noncoincidence is detected for a functional item after the comparison by the comparator means.

In the radio communication apparatus according to the first embodiment of the subject invention, when a command is issued from the registration commanding means or the confirmation commanding means, the data recording means writes functional setting data detected by the detection means into the first data storage area or the second data storage area in the storage means, respectively, according to the command.

When the command is issued from the registration commanding means or the confirmation commanding means, the storage means stores functional setting data and the corresponding functional setting data. Both of the functional setting data is classified according to respective functional items. When data storage into the storage means is performed according to a command from the confirmation commanding means, the comparator means makes a comparison between the functional setting data in the first data storage area and the functional setting data in the second data storage area, for each functional item. If the functional setting data in the first data storage area and the second data storage area do not coincide, the notification means notifies of it.

Accordingly, if a command is issued from the registration commanding means and then a command is issued from the confirmation commanding means as required, it can be checked whether changes in any of the functional settings has been made, by the use of the notification means.

Incidentally, as the method of notification, illumination or flashing of an indicator lamp may be used. Alternatively, display of functional setting data in the first storage region and functional setting data in the second storage region that do not coincide, and a functional item associated therewith by the use of the display means may also be used. Further, this data display may also be used together with the above-mentioned indication by an indicator lamp.

The radio communication apparatus according to a second embodiment of the subject invention comprises:

confirmation commanding means for commanding confirmation of the functional settings;

storage means having a first data storage area and a second data storage area, both being classified into fields according to respective functional items;

detection means for detecting functional settings for the communication circuits at a point when a command input from the operator section is not detected for a predetermined time or when a command is issued from the confirmation commanding means;

data recording means for writing data on the functional settings detected by the detection means into the first data storage area in the storage means, corresponding to the respective functional items when the command input from the operator section is not detected for the predetermined time, and writing data on the functional settings detected by the detection means into the second data storage area in the storage means, corresponding to the respective functional items when the command is issued from the confirmation commanding means;

comparator means for comparing the functional setting data corresponding to the respective functional items in the first data storage area with the functional setting data corresponding to the respective functional items in the second data storage area after the data recording means writes the functional setting data into the second data storage area in the storage means; and notification means for, when a result of a noncoincidence is detected for a functional item after the comparison by the comparator means, displaying the functional item and functional setting data associated with the functional item.

In the radio communication apparatus according to the first embodiment, when a command is issued from the registration commanding means at predetermined intervals, the functional setting data at that point is registered. On contrast therewith, in the radio communication apparatus according to the second invention, when no command input is obtained from the operator section for a predetermined time, the detection means detects functional settings associated with respective functional items for communication circuits. Then, the data recording means automatically performs data writing into the first data storage area in the storage means.

Further, according to the second invention, a method of displaying functional settings in the first and second storage regions that do not coincide, and the functional item associated therewith is employed for giving notification.

Thus, let us assume that the "predetermined time" is set to be as short as possible on condition that data processing by the microcomputer circuit is possible, and when an erroneous operation is performed, it is arranged that a command is issued from the confirmation commanding means. Then, even if the erroneous operation is performed, modified functional data and a functional item associated with the erroneous operation can be immediately identified through the display of the notification means.

In this case, indicator lamp flashing may also be used as the notification method, as described above.

Further, in the radio communication apparatus according to the first and second embodiments of the subject invention, it is preferable that restoration commanding means for commanding restoration of the functional settings and restoration control means are added. The restoration control means uses the functional setting data in the first data storage area in the storage means associated with the functional item for which the result of the noncoincidence is detected after the comparison by the comparator means. Then, the restoration control means causes the restoration of the functional settings for the communication circuits to be performed, when the notification by the notification means is made and then a command for the restoration is issued from the restoration commanding means.

With these means, according to the first embodiment, functional settings can be restored to their states at the point when a command is issued from the registration commanding means. Further, according to the second embodiment, functional settings can be restored to their states immediately before the erroneous operation is performed.

The various features of novelty which characterize the invention are pointed out with particularity in the claims annexed to and forming a part of this specification. For a better understanding of the invention, its operating advantages, and specific objects attained by its use, reference should be had to the accompanying drawings and descriptive matter in which there are preferred embodiments of the present invention.

DETAILED DESCRIPTION OF THE PREFERRED EMBODIMENTS

Now, an embodiment of a radio communication apparatus according to the present invention will be described in detail with reference to the appended drawings.

Figure 1:
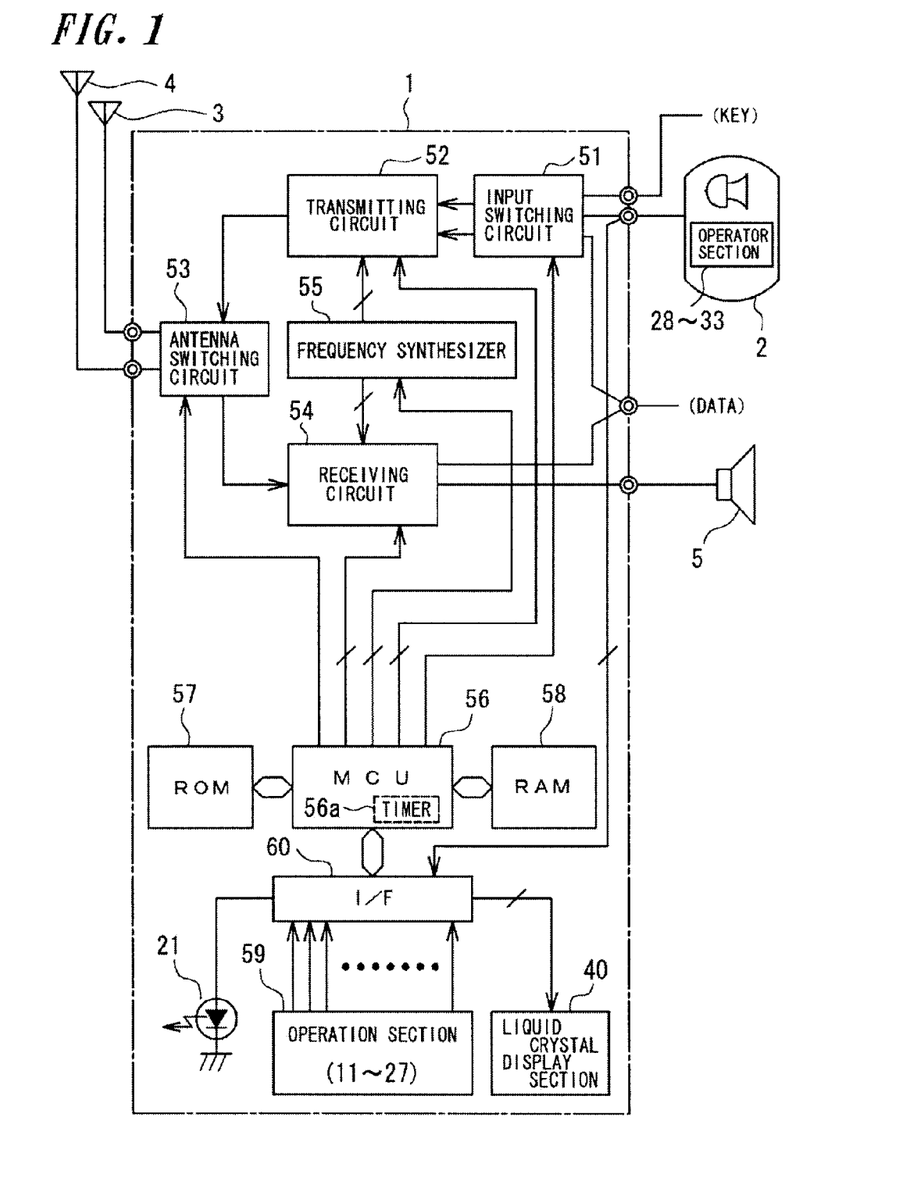
FIG. 1 is a schematic system block diagram of a radio transmitter-receiver according to an embodiment of the present invention.

First, FIG. 1 is a schematic system block diagram of the radio transmitter-receiver in FIG. 6, described before.

As shown in FIG. 6, the microphone 2 is connected to the main unit 1 through a microphone jack. In addition, connectors for connecting antennas 3 and 4 that are selected according to a frequency band, a connector for connecting keys (KEYs), an input/output connector for data (DATA), and a connector for connecting a loudspeaker 5 are disposed on the rear and side surfaces of the main unit 1. FIG. 1 schematically shows the radio transmitter-receiver including these components.

Referring to FIG. 1, reference numeral 51 denotes an input switching circuit for performing switching between a key input and a microphone input. Reference numeral 52 denotes a transmitting circuit including functional modules for transmission, such as a modulator, a BPF, a mixer, an exciting amplifier, and a power amplifier, reference numeral 53 denotes an antenna switching circuit for switching uses of the antennas 3 and 4. Reference numeral 54 denotes a receiving circuit including functional modules for reception, such as a high-frequency amplifier, a mixer, a BPF, an IF amplifier, a demodulator, and a low-frequency amplifier. Reference numeral 55 denotes a frequency synthesizer for supplying a signal of a local oscillation frequency to each of the mixers, modulators, and demodulators in the transmitting circuit 52 and the receiving circuit 54 to make frequency settings and perform modulation. Reference numeral 56 denotes an MCU (micro controller unit) for controlling functional modules in the transmitting and receiving circuits and an entire system including operation and display circuits, which will be described later. Reference numeral 57 denotes a ROM that stores various control programs to be performed by the MCU 56 and necessary, fixed data. Reference numeral 58 denotes a RAM for storing updated data.

Reference numeral 59 denotes an operator section on which the switches and knobs 11 to 27 are mounted, reference numeral 21 denotes an indicator lamp, and reference numeral 40 denotes a liquid crystal display section. The MCU 56 receives an operation command input signal from the switches and knobs 11 to 27 on the operator section 59 and the switches 28 to 33 contained in the microphone 2 through the input/output interface (I/F) 60. The MCU 56 controls the indicator lamp 21 and transfers display data to the liquid crystal display section 40 through the I/F 60.

Accordingly, the basic circuit structure of the radio transmitter-receiver described above is not so different from a normal radio transmitter-receiver. However, this embodiment is characterized in that control programs in "a status registration mode" and a "status confirmation mode", associated with functional settings for the system are stored in the ROM 57, and that a data table used for executing these control programs is stored in the RAM 58.

Next, operation procedures in the above-mentioned modes will be described with reference to the data table and flowcharts illustrated in FIG. 2 to FIG. 5, one after another.

Figure 2:
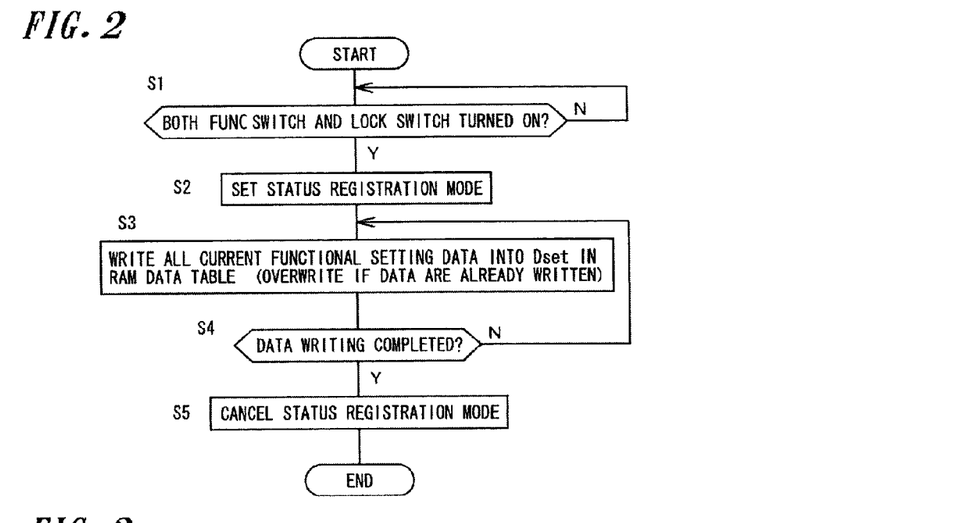
FIG. 2 is a flowchart showing an operation procedure in a status registration mode.

First, the flowchart in FIG. 2 shows the operation procedure in the status registration mode.

If an operator turns ON the FUNC switch 18 and the LOCK switch 27 or 30 simultaneously during the operation of the system in step S1, the MCU 56 detects the operation command input through the I/F 60. Then, the MCU 56 sets the status registration mode by an interrupt and executes the control program associated with this mode in step S2.

For the operation of the system, the MCU 56 controls various functional modules in the transmitting circuit 52 and the receiving circuit 54, the local oscillation frequencies from the frequency synthesizer 55, and the connection statuses of the input switching circuit 51 and the antenna switching circuit 53, according to operation command inputs from the switches and knobs 11 to 27 on the operator section 59 and the switches 28 to 33 in the microphone 2. The MCU 56 thereby makes various functional settings corresponding to transmitting and receiving conditions that have been commanded and selected. If the status registration mode described above is set, the MCU 56 detects functional setting data at that point, and writes it in the data table in the RAM 58 in step S3.

Figure 3:
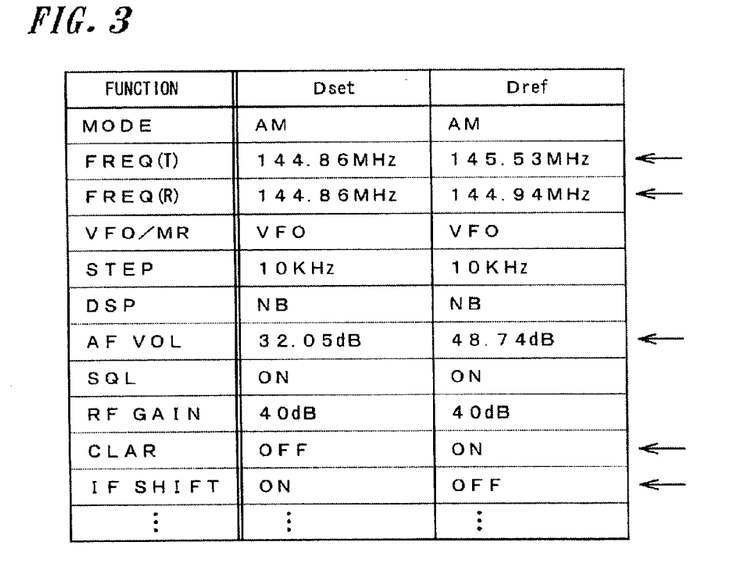
FIG. 3 is a RAM data table.

Namely, as shown in FIG. 3, the data table in the RAM 58 is configured such that two data cells Dset and Dref are provided, corresponding to respective functional items associated with the transmitting and receiving conditions. In this status registration mode, the MCU 56 writes functional setting data in the data cell Dset in the data table.

The functional items in the table are associated with the transmitting and receiving conditions that are modified and set according to the types of the operation of the radio transmitter-receiver. In this embodiment, a MODE (radio mode), a FREQ (T) (transmitting frequency), FREQ(R) (receiving frequency), a VFO/MR (VFO scanning function/ memory channel scanning function), a STEP (frequency adjustment step), a DSP (selection of the DSP NR/DSP AUTO NOTCH/DSP BPF mode), an AF VOL (received sound volume), an SQL (squelch ON/OF), RF GAIN (receiving circuit gain), a CLAR (clarifier ON/OFF), an IF SHIFT (shift function ON/OFF) are provided as the functional items.

If the functional setting data is already written in the data cell Dset, it is updated by overwriting.

Then, if the data writing is completed in step S4, the MCU 56 cancels the status registration mode. Then, the system returns to its original state in step S5.

In other words, this status registration mode is set for the occasion of the change of operator, and is used to record the transmitting and receiving conditions at the point of operator change in the data table.

After the operator change, an operator who performs communication thereafter may modify the transmitting and receiving conditions or set new transmitting and receiving conditions by means of the operator section 59 and the switches 28 to 33 in the microphone 2.

Thus, when the initial operator has returned for the change to resume communication, functional settings associated with the original transmitting and receiving conditions would not always remain the same.

In this case, the initial operator turns on the FUNC switch 18 and the HOME switch 26 simultaneously to set the status confirmation mode. In this case, it should be arranged that the status registration mode is set by the initial operator alone for the occasion when the change to the initial operator is made.

Figure 4:
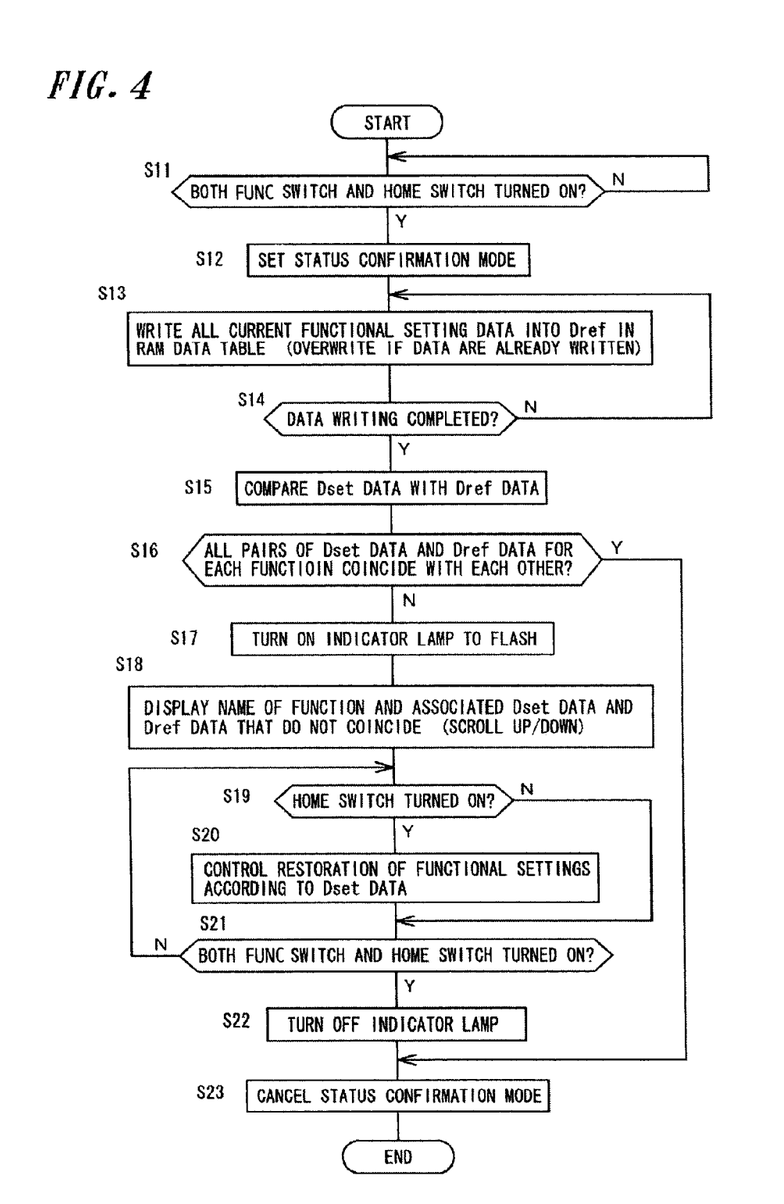
FIG. 4 is a flowchart showing an operation procedure in a status confirmation mode.

An operation procedure in this status confirmation mode is shown in a flowchart in FIG. 4. According to the mode setting operation, the MCU 56 interrupts the procedure of the system to execute the control program in the status confirmation mode in steps S11 and S12.

For execution of the control program, the MCU 56 first detects all functional setting data at that point, as in the status registration mode, and then writes them in the Dref (refer to FIG. 3) in the data table in the RAM 58 in step S13. If the data is already written in the Dref of the data table, it is updated by overwriting.

Thus, the functional setting data for the occasion of the future change to the initial operator is stored in the Dset of the data table, while the functional setting data at the current point of the operator is stored in the Dref, both corresponding to respective functional items.

Then, upon completion of data writing into the Dref of the data table in step S14, the MCU 56 makes comparisons between the functional setting data in the Dset and the functional setting data in the Dref, for respective functional items, to determine whether all pairs of functional setting data in the Dset and the Dref coincide in steps S15 and S16.

If all pairs of the functional setting data in the Dset and the Dref are determined to coincide, the status confirmation mode is terminated in steps S16 and S23. If a functional item is detected for which functional setting data in the Dset does not coincide with the corresponding one in the Dref, the MCU 56 supplies a control signal to the indicator lamp 21 through the I/F 60 to cause the indicator lamp 21 to flash in steps S16 and S17.

Accordingly, if the indicator lamp 21 does not flash, the initial operator can confirm that the operator who has performed communication thereafter did not modify the original functional settings. For this reason, he can confirm that communication can be resumed with the original functional settings remain unmodified.

On the other hand, if the indicator lamp 21 flashes, it means that one or more of the functional settings has been modified. However, it cannot be known what functional setting associated with which functional item has been modified.

Thus, in this embodiment, the MCU 56 reads out a functional item and functional setting data associated with the functional item in the Dset and the Dref that do not coincide, from the data table in the RAM 58. Then, the MCU 56 transfers them to the liquid crystal section 40 through the I/F 60 for display in step S18.

To take an example, if functional setting data in the Dset in the status registration mode and functional setting data in the Dref in the status confirmation mode are as shown in FIG. 3, it means that functional items indicated by arrows have been modified. Consequently, display of FREQ (T): 144.86 MHz→145.53 MHz, FREQR: 144.86 MHz→144.94 MHz, AF VOL: 32.05 dB→48.74 dB, CLAR:OFF→ON, and IF SHIFT:ON→OFF is performed.

Since the liquid crystal display section 40 does not have so large a display area, the UP and DOWN switches 19 are employed for scrolling so as to allow confirmation of all functional item data that has been modified.

Next, the operator, who has confirmed from the liquid crystal display section 40 that modification of functional settings has been made, turns on the HOME switch 26 in step S19, if it is necessary to restore the current functional settings to their original states.

In this case, the MCU 56 regards a signal indicating turning ON of the HOME switch 26 in the state confirmation mode as a command for restoration. Then, according to the displayed functional setting data in the Dset associated with the functional items, the MCU 56 controls the functional modules of the transmitting circuit 52 and the receiving circuit 54 associated with the functional items. Then, the MCU 56 thereby automatically restores the current functional settings to their original states in step S20.

If communication is then resumed in the restored original states, the operator should turn on the FUNC switch 18 and the HOME switch 26 simultaneously in step 21, as in the case where the state confirmation mode has been set. If communication is to be carried on in the state where modification of the functional settings was performed, the operator should turn on the FUNC switch 18 without turning on the HOME switch 26. In response to the operation command signal, the MCU 56 turns off the indicator lamp 21 and then cancels the status confirmation mode in steps S22 and S23.

Thus, according to the status confirmation mode, when the operator resumes communication, it can be checked from the state of the indicator lamp 21 whether the current functional settings are modified from the functional settings previously stored in the status registration mode. Further, if modification has been performed, it can be confirmed which functional item is modified. Then, restoration to the original functional settings can be performed by a simple operation, if necessary.

Incidentally, the status registration mode in FIG. 2 described above is set as required, for the occasion of the operator change, for example. The status registration mode is not effective in the case the immediately preceding functional settings are to be restored after an unintended erroneous operation has been performed.

In other words, even if the operator who has changed performs modification of functional settings associated with transmitting and receiving conditions at will, restoration to the state at the point of the operator change alone can be performed. Restoration of functional settings to their preceding state immediately before the occurrence of an unintended erroneous operation is not guaranteed.

Figure 5:
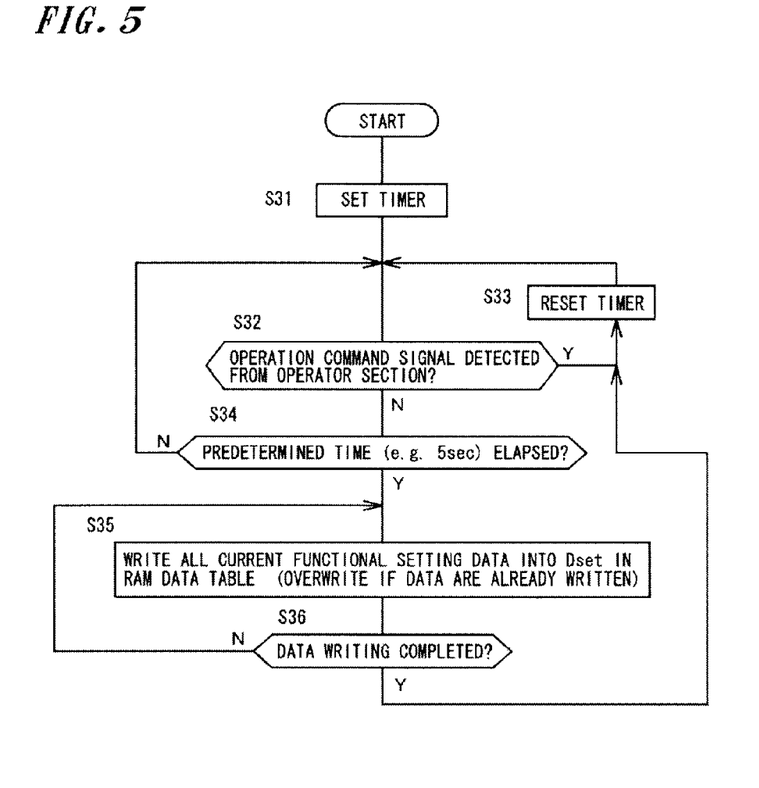
FIG. 5 is a flowchart showing an procedure of periodically performing an automatic registration process for functional settings.

In order to address this problem, use of a periodically automatic registration process in combination with the state confirmation mode as shown in a flowchart in FIG. 5, in place of the state registration mode set by manipulating the FUNC and LOCK switches, is effective.

First, when the radio transmitter-receiver system is powered up, the MCU 56 activates a built-in timer 56a in step S31. Then, the MCU 56 monitors whether an operation command signal has been detected from the operator section 59 or the switches 28 to 33 in the microphone 2 through the I/F 60 in step S32.

If the operation command signal has been detected, the MCU 56 resets the timer 56a in steps S32, S33, and then S32. If a predetermined time such as five seconds has elapsed with no operation command signal detected in step S34, the MCU 56 writes functional setting data at that point into the Dset in the data table of the RAM 58 in step S35, as in the case of the status registration mode.

In this case, except in the initial state, data is already written. Thus, in order to update the data, overwriting is performed.

Then, upon completion of data writing in step S36, the MCU 56 resets the timer 56a in step S33. Thereafter, the MCU 56 repeats the operations of steps S32 to S36 for execution of operations in steps S33 and S32.

Accordingly, if the before-mentioned status confirmation mode in FIG. 4 is set immediately after the occurrence of an unintended erroneous operation, the contents of the unintended erroneous operation can be confirmed, and functional settings can be returned to the state immediately before the unintended erroneous operation has been performed. Thus, communication can be continued smoothly without interruption.

Incidentally, when the periodically automatic registration process is selectively set in combination with the status registration mode described above, combinations of various switches which are not used by the system, may be allocated to issue a command for the selection. Then, either one of the periodically automatic registration process and the status registration mode should be executed, as required.

In the above embodiment, the description was directed to the radio transmitter-receiver. The present invention, however, can be applied to transmitters and receivers separately as well.

Further, in this embodiment, if modification of any of functional settings has been identified in the status confirmation mode, notification is made by flashing of the indicator lamp 21. Notification by a beep sound or display of a message on the liquid crystal display section 40, for example, may also employed.

Still further, in this embodiment, the status registration mode and the status confirmation mode are set by the use of combinations of the switches. A dedicated switch, however, may be provided and may also be employed for making a setting operation.

Those skilled in the art will recognize further variations are possible within the scope claimed below.

What is claimed:

1. A radio communication apparatus in which a microcomputer thereof controls communication circuits thereof according to command inputs from an operator section thereof to make functional settings associated with communication conditions, the radio communication apparatus comprising:

registration commanding means for commanding registration of the functional settings;

confirmation commanding means for commanding confirmation of the functional settings;

storage means having a first data storage area and a second data storage area, both being classified into fields according to respective functional items;

detection means for detecting functional settings for the communication circuits, associated with the respective functional items at a point when a command is issued from said registration commanding means or said confirmation commanding means;

data recording means for writing data on the functional settings detected by said detection means into the first data storage area in said storage means, corresponding to the respective functional items, according to the command from said registration commanding means, and writing data on the functional settings detected by said detection means into the second data storage area in said storage means, corresponding to the respective functional items, according to the command from said confirmation commanding means;

comparator means for comparing the functional setting data associated with the respective functional items in the first data storage area with the functional setting data associated with the respective functional items in the second storage area after said data recording means writes the functional setting data into the second data storage area in said storage means; and notification means for notifying of a noncoincidence when a result of the noncoincidence is detected for a functional item after the comparison by said comparator means.

2. The radio communication apparatus according to claim 1, wherein the notification comprises illumination or flashing of an indicator lamp.

3. The radio communication apparatus according to claim 1, wherein the notification comprises the display of the functional item for which the result of the noncoincidence is detected and functional setting data associated with the functional item.

4. The radio communication apparatus according to claim 1, wherein the notification comprises illumination or flashing of an indicator lamp and the display of the functional item for which the result of the noncoincidence is detected and functional setting data associated with the functional item.

5. The radio communication apparatus according to claim 1 further comprising:

restoration commanding means for commanding restoration of the functional settings; and restoration control means for causing the restoration of the functional settings for the communication circuits to be performed when the notification by the notification means is made and then a command for the restoration is issued from said restoration commanding means, said control means using the functional setting data in the first data storage area in said storage means associated with the functional item for which the result of the noncoincidence is detected after the comparison by said comparator means.

6. The radio communication apparatus according to claim 2 further comprising:

restoration commanding means for commanding restoration of the functional settings; and restoration control means for causing the restoration of the functional settings for the communication circuits to be performed when the notification by the notification means is made and then a command for the restoration is issued from said restoration commanding means, said control means using the functional setting data in the first data storage area in said storage means associated with the functional item for which the result of the noncoincidence is detected after the comparison by said comparator means.

7. The radio communication apparatus according to claim 3 further comprising:

restoration commanding means for commanding restoration of the functional settings; and restoration control means for causing the restoration of the functional settings for the communication circuits to be performed when the notification by the notification means is made and then a command for the restoration is issued from said restoration commanding means, said control means using the functional setting data in the first data storage area in said storage means associated with the functional item for which the result of the noncoincidence is detected after the comparison by said comparator means.

8. The radio communication apparatus according to claim 4 further comprising:

restoration commanding means for commanding restoration of the functional settings; and restoration control means for causing the restoration of the functional settings for the communication circuits to be performed when the notification by the notification means is made and then a command for the restoration is issued from said restoration commanding means, said control means using the functional setting data in the first data storage area in said storage means associated with the functional item for which the result of the noncoincidence is detected after the comparison by said comparator means.

9. A radio communication apparatus in which a microcomputer thereof controls communication circuits thereof according to command inputs from an operator section thereof to make functional settings associated with communication conditions, the radio communication apparatus comprising:

confirmation commanding means for commanding confirmation of the functional settings;

storage means having a first data storage area and a second data storage area, both being classified into fields according to respective functional items;

detection means for detecting functional settings for the communication circuits at a point when a command input from the operator section is not detected for a predetermined time or when a command is issued from said confirmation commanding means;

data recording means for writing data on the functional settings detected by said detection means into the first data storage area in said storage means, corresponding to the respective functional items when the command input from the operator section is not detected for the predetermined time, and writing data on the functional settings detected by said detection means into the second data storage area in said storage means, corresponding to the respective functional items when the command is issued from said confirmation commanding means;

comparator means for comparing the functional setting data corresponding to the respective functional items in the first data storage area with the functional setting data corresponding to the respective functional items in the second data storage area after said data recording means writes the functional setting data into the second data storage area in said storage means; and notification means for, when a result of a noncoincidence is detected for a functional item after the comparison by the comparator means, displaying the functional item and functional setting data associated with the functional item.

10. The radio communication apparatus according to claim 9 further comprising:

restoration commanding means for commanding restoration of the functional settings; and restoration control means for causing the restoration of the functional settings for the communication circuits to be performed when the notification by the notification means is made and then a command for the restoration is issued from said restoration commanding means, said control means using the functional setting data in the first data storage area in said storage means associated with the functional item for which the result of the noncoincidence is detected after the comparison by said comparator means.

* * * * *